United States Patent [19]
Heimann et al.

[11] Patent Number: 6,017,857
[45] Date of Patent: *Jan. 25, 2000

[54] CORROSION RESISTANT LUBRICANTS, GREASES, AND GELS

[75] Inventors: Robert L. Heimann, Moberly; Nancy M. McGowan, Sturgeon; William M. Dalton, Moberly; Daniel I. Crosby, Hallsville, all of Mo.

[73] Assignee: Elisha Technologies Co LLC, Moberly, Mo.

[*] Notice: This patent is subject to a terminal disclaimer.

[21] Appl. No.: 09/045,450

[22] Filed: Mar. 20, 1998

Related U.S. Application Data

[63] Continuation-in-part of application No. 09/016,461, Jan. 30, 1998
[60] Provisional application No. 60/045,466, May 2, 1997, and provisional application No. 60/036,026, Jan. 31, 1997.

[51] Int. Cl.$^7$ .................. C10M 113/08; C10M 113/12; C10M 125/00
[52] U.S. Cl. .................. 508/136; 508/137; 508/138; 508/141; 508/181; 508/491; 427/207.1; 427/318; 427/419.1; 427/421; 427/428; 427/429; 427/430.1
[58] Field of Search .................. 508/121, 125, 508/137, 138, 139, 161, 136, 141, 155, 181, 491; 427/421, 428, 429, 430.1, 419.1, 318, 207.1

[56] References Cited

U.S. PATENT DOCUMENTS

| | | | |
|---|---|---|---|
| 2,477,311 | 7/1949 | Morway | 508/125 |
| 3,074,884 | 1/1963 | Pitman | 508/147 |
| 3,159,577 | 12/1964 | Ambrose et al. | 508/138 |
| 3,525,689 | 8/1970 | Marotta . | |
| 3,833,513 | 9/1974 | Fath . | |
| 4,396,514 | 8/1983 | Randisi | 508/138 |
| 4,406,800 | 9/1983 | Christian . | |
| 4,548,960 | 10/1985 | Bentley | 508/138 |
| 4,701,016 | 10/1987 | Gartside, III et al. . | |
| 4,735,146 | 4/1988 | Wallace . | |
| 4,810,395 | 3/1989 | Levy et al. . | |
| 4,859,352 | 8/1989 | Waynick . | |
| 4,908,151 | 3/1990 | Inoue et al. . | |
| 5,037,566 | 8/1991 | Randisi | 508/138 |
| 5,050,959 | 9/1991 | Randisi | 508/136 |
| 5,190,682 | 3/1993 | Harris | 508/121 |
| 5,433,872 | 7/1995 | Brauer et al. | 508/136 |
| 5,512,188 | 4/1996 | Kinoshita et al. | 508/137 |
| 5,595,961 | 1/1997 | Doner et al. . | |
| 5,595,965 | 1/1997 | Wiggins . | |
| 5,714,093 | 2/1998 | Heimann et al. | 252/389.2 |

FOREIGN PATENT DOCUMENTS

| | | |
|---|---|---|
| 4041156 A1 | 6/1992 | Germany . |
| 4423203 A1 | 1/1995 | Germany . |
| 6-248287 | 9/1994 | Japan . |
| WO92/00368 | 1/1992 | WIPO . |
| WO95/19410 | 7/1995 | WIPO . |
| WO96/11245 | 4/1996 | WIPO . |
| WO96/12770 | 5/1996 | WIPO . |

OTHER PUBLICATIONS

The Chemistry of Soap Base Greases—Oct. 1996.
International Search Report Sep. 6, 1998.
Additives for Grease—Oct. 1992.
An Introduction to Lubricating Greases—Oct. 1996.
Grease Manufacture in Conventional Kettles—Oct. 28, 1996.
Measurement of Corrosion Under Insulation and Effectiveness of Protective Coating—1996 Date Unavailable.
Synthetic Lubricants Mobil Oil Corporation Lubrication Fundamentals—1980 Month Unavailable.
Synethetic Lubricants and High–Performance Functional Fluids—1993 Month Unavailable.

*Primary Examiner*—Margaret Medley
*Attorney, Agent, or Firm*—Michael K. Boyer

[57] ABSTRACT

The disclosure relates to improved gel/grease compositions as well as grease compositions capable of imparting improved corrosion resistance. The grease includes a silica/silicate mixture that can imparts a relatively high pH and corrosion resistant properties to the grease.

23 Claims, 1 Drawing Sheet

CORROSION RESISTANT LUBRICANTS, GREASES, AND GELS

The subject matter of herein is a continuation-in-part of U.S. patent application Ser. No. 09/016,461, filed on Jan. 30, 1998 and entitled "Corrosion Resistant Lubricants, Greases, and Gels" now allowed. The subject matter herein claims benefit under 35 U.S.C. 111(a), 35 U.S.C. 119(e) and 35 U.S.C. 120 of Provisional Patent Application Serial No. 60/045,466, filed on May 2, 1997; and U.S. Provisional Patent Application Serial No. 60/036,026, filed on Jan. 31, 1997; both of which are entitled "Corrosion Resistant Lubricants, Greases, and Gels". The disclosure of the aforementioned Provisional and Non-Provisional Patent Applications is hereby incorporated by reference.

FIELD OF THE INVENTION

The instant invention relates to improved grease compositions as well as grease compositions capable of imparting improved corrosion resistance.

BACKGROUND OF THE INVENTION

The American Society for Testing and Materials (ASTM D288 standard definition of the terms relating to petroleum) defines a lubricating grease as a solid to semi-fluid product of dispersion comprising a thickening agent and a liquid lubricant. Other ingredients imparting special properties may be included. This definition indicates that a grease is a liquid lubricant thickened in order to provide properties that are not provided solely by the liquid lubricant. Typically, greases are employed in dynamic rather than static applications. Gels are normally classified as a colloid and provide utility in non-dynamic applications ranging from sol-gels to cosmetic applications.

Conventional grease formulations are described in "Synthetic Lubricants and High-Performance Functional Fluids", edited by Ronald L. Shubkin (dated 1993). The characteristics of soap based greases, additives and methods for making conventional greases are described in "The Chemistry of Soap Base Greases" by Glen Brunette, "Additives For Grease", by Dr. Miles Hutchings and "Grease Manufacture in Conventional Kettles" by K. F. Montgomery all of which were presented at the 63rd NLGI Annual Meeting, October 1996. The disclosure of the previously identified publications is hereby incorporated by reference.

Commercial industrial practice employs lubricating films and greases to prevent galling and fretting. The increased efficiency and complexity of modem machines often require such films and greases to perform under severe operating and environmental conditions. While the composition of a gel may be similar to a grease, typically gels are employed to solve non-lubricating problems. There is a need in this art for lubricants, greases and gels that also impart corrosion resistance.

SUMMARY OF THE INVENTION

The instant invention solves problems associated with conventional lubricants and greases by providing an improved composition which imparts corrosion and microbial resistance, and a high dropping point. By "dropping point" it is intended to mean the temperature at which lubricating compositions become fluid and thereby able to drip through an orifice in accordance with ASTM D2265. The inventive grease typically has a minimum dropping point of about 250° C.

The instant invention also provides a composition that can offer an alternative to conventional greases and gels thereby also avoiding the environmental and manufacturing problems associated with conventional grease products. The inventive greases and gels can be tailored to range from microbial resistant to biodegradable; but in either case the greases/gels are non-toxic. While the instant invention is compatible with a wide range of metals and metallic coatings, the instant invention can also obviate the usage of environmentally undesired metals, e.g., chrome, that are conventionally employed for imparting corrosion resistance. Similarly, while the instant invention can be employed with a solvent, in certain aspects the inventive grease/gel can be solvent free or substantially solvent free. By "substantially solvent free", it is meant that the grease/gel contains less than about 30 wt. %; and normally less than 10 wt. %, of volatile organic compounds (otherwise known as V.O.C.s). By "solvent free" it is mean that the grease/gel contains less than 5 wt. % and normally less than 1 wt. % of volatile organic compounds (V.O.C.s).

The inventive grease/gel can be employed as a substitute for conventional greases/gels; especially in environments where improved corrosion resistance is desired, e.g., wire rope and strand that is used in a wide range of applications including automotive and marine end-uses. Further, the inventive grease/gel can be employed for reducing, if not eliminating, corrosion under insulation (CUI). That is, corrosion upon metallic surfaces which are covered by an insulating covering or layer, e.g., a mechanically attached insulating sleeve upon a pipe. CUI is particularly problematic in the petroleum industry wherein corrosion can occur under refinery pipes, cracking columns, oil/gas pipelines, reaction vessels, among other areas. Corrosion under insulation can also occur in heating ventilation and cooling (HVAC) water lines, steam lines for chemical processing and power generation, conduits/piping on ships, among other areas. The instant invention can also offer an alternative to silicone containing lubricants. For example, in automotive painting environments silicone oils have been associated with adverse affects, e.g., on the quality of painted surfaces due to low molecular fractions of the silicone becoming air-borne under ambient conditions. The instant invention, however, can improve the corrosion resistance of silicone containing lubricants and gels. The inventive grease/gel can also be employed upon wire rope or strand for end-uses in automotive, industrial, marine cables, among other uses.

The fluid or liquid portion of the inventive grease/gel can comprise a base oil comprising at least one member selected from the group consisting of mineral oil, synthetic oil, vegetable oil, fish oil, animal oil among any suitable fluid having lubricating properties. Examples of suitable base oils include at least one member from the group consisting of animal, vegetable, petroleum derived and synthetic oils such as polyalphaolefin (PAO), silicone oil, phosphate esters, fluorinated oils such as KRYTOX (supplied by the DuPont Company, Wilmington, Del.), mixtures thereof, among others. Typically, the base oil will comprise about 45 to about 90 wt. % of the grease e.g., about 70 wt. % to about 90 wt. %.

Environmentally preferred lubricants (EPL's) are preferred as base oils in applications where loss of material to the environment can occur. EPL's have the distinction of being biodegradable and/or essentially non-toxic. Biodegradable base oils include, but are not limited to fish oils, vegetable oils, lanolin, synthetic esters, low molecular weight polyalfaolefins, and polyalkylene glycols. Essentially non-toxic base oils include but are not limited to polyalfaolefins, polybutenes, vegetable oils and also lanolins.

For applications requiring that the grease be exposed to a relatively high or low temperature, or wide variation in temperature during operation, synthetic fluids are typically employed, e.g., a diester oil based grease. If the grease comprises a metallic soap grease, then complexing agents can be employed for improving the so-called "dropping point" of the grease. Such agents are usually present in an amount from about 5 to about 25 wt. % of the grease.

A thickener is combined with a base oil to form a grease or gel. The thickener component of the grease can comprise any material that in combination with the selected base oil will produce a semi-fluid or solid structure. Examples of a suitable thickener comprise at least one member selected from the group consisting of soaps of aluminum, lithium, barium, sodium, calcium, mixtures thereof, and, in some cases, silicas and clays, mixtures thereof, among others. Characterization of grease as a function of the thickener is described in greater detail by J. George Wills in "Lubrication Fundamentals" (1980); hereby incorporated by reference. Thickeners of differing composition can be blended together, e.g., TEFLON fluoropolymers and polyethylene, provided they are compatible with one another and with the base oil. Additional ingredients can be combined with the thickener to impart special features or properties such as coupling agents dyes, pigments, anti-oxidants, among other components for tailoring the properties of the grease. Normally, the thickener will comprise about 5 to about 10 wt. % of the grease, and additional ingredients will comprise a total amount of about 5 to about 30 wt. %. However, when thermoplastic powders, for example, polytetrafluoroethylene, polyethlene and the like, are used as thickeners can be used effectively in amounts up to about 50% by weight The inventive grease can also comprise at least one anti-wear agent which may also function as a pour-point depressant, and/or an extreme pressure agent. Examples of suitable anti-wear agents comprise at least one member from the group consisting of tricresyl phosphate, dithiophosphates, fatty acid esters, metal stearates, zinc oxide, borax, boron nitride, ammonium molybdate, calcium carbonate, mixtures thereof, among others. In some cases, molybdenum disulfide, polyethylene, polytetrafluoroethylene, polyvinylidene fluoride/polyvinyl fluoride and dispersions thereof; mixtures thereof, among others, can be added to reduce friction and wear. Anti-wear agents can comprise about 0.1 to about 2 wt. % of the grease. Examples of extreme pressure agents can comprise at least one member selected from the group of graphite, triphenyl phosphorothionate, chlorinated parafins, dithiocarbonates, fatty oils, fatty acids, or fatty acid esters with a phosphite adduct; sulfurized fatty oils, fatty acids, or fatty acid esters; molybdenum disulfide, tungsten disulfide, phosphate esters, phosphorous-sulfur containing compounds, mixtures thereof, among others. Powdered extreme pressure agents can protect rough or uneven surfaces as well as tapered crevices when the agents are composed of a sufficiently wide particle size distribution and with an appropriate limit on the maximum particle size. The particle size distribution would normally allow the EP agent to fill in gaps and spaces upon the article to be protected (such as exist in wire rope, stranded cable, or armored cable). Extreme pressure agents can comprise about 2 to about 10 wt. % of the grease.

Surfactants, wetting agents, or surface active agents can optionally be included when desirable, such as pine oil and derivatives, Tall oil and derivatives, ethoxylates, acetylenic diols, silicones, silanes, sulfonates, fluorosurfactants, mixtures thereof, among others.

The inventive grease can further comprises at least one of silica and/or a silicate containing component for imparting corrosion resistance, e.g., a component containing —SiO— groups. The silicate containing component can interact with another component of the grease and/or a surface being protected. The interaction can provide a protective surface having enhanced corrosion resistance. The amount of silica/silicate containing material can range from about 1 to about 50 wt. % of the grease. The specific amount of silicate containing material is ascertained when considering the relative importance of corrosion resistance and lubrication for a particular application as well as the thickening ability of the silica or silicate.

In some cases, it is desirable to utilize a gel with less potential for oil to migrate out of or separate from the gel. Drying oils, e.g., linseed, or non-drying polymers can be added to the gel to reduce oil loss or migration from the gel. Polymers include but are not limited to polyurethane, silicone, acrylic, epoxy and oil modified polymers. High solids polymers or substantially solvent free polymers are environmentally preferred, e.g., polymers containing less than about 30 wt. % V.O.Cs.

In other cases, it is desirable for the gel to form an outer self-supporting layer or skin. The portion of the gel underlying the self-supporting layer normally remains in a substantially unchanged state, e.g., the retained physical characteristics of the underlying portion resemble those of an newly applied gel coating. An added benefit of forming a self-supporting layer or so-called skin at the surface of the gel which provides improved resistance to rainwater and incidental contact.

CROSS REFERENCE TO RELATED PATENTS AND PATENT APPLICATIONS

Figure 1:
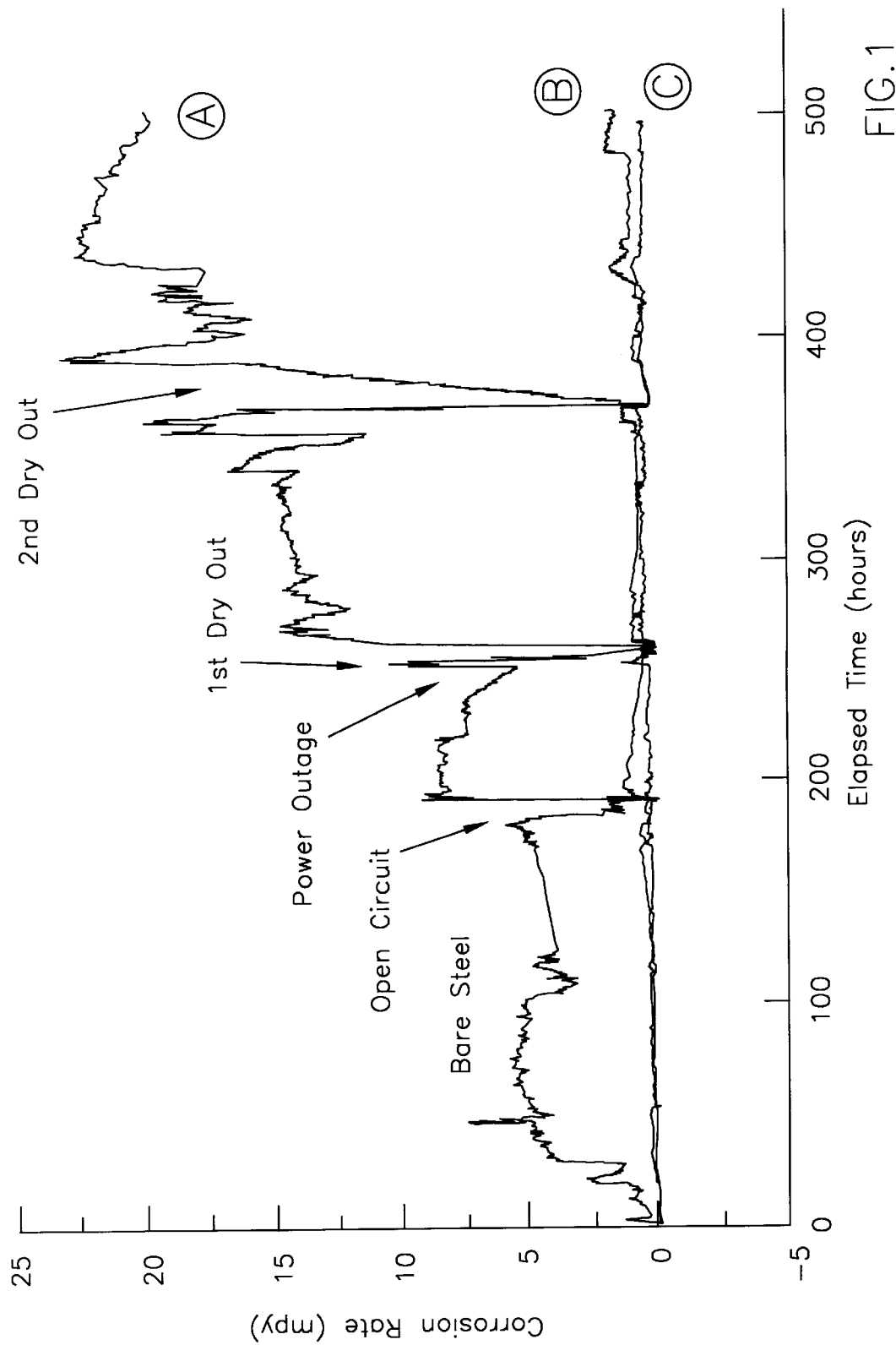
FIG. 1 is a graphical representation of steel corrosion when under insulation in terms of Time v. Corrosion Rate (mills per year—mpy).

The subject matter of the instant invention is related to copending and commonly assigned Non-Provisional U.S. patent application Ser. No. 09/016,853 (Attorney Docket No. EL001RH-8), filed on Jan. 30, 1998; Ser. Nos. 08/850, 323 and 08/850,586 (EL001RH-6 and EL001RH-7 filed on May 2, 1997); Ser. No. 08/791,336 (Attorney Docket No. EL001RH-5 filed on Jan. 31, 1997) and 08/791,337 (Attorney Docket No. EL001RH-4 filed on Jan. 31, 1997) in the names of Robert L. Heimann et al., as a continuation in part of Ser. No. 08/634,215 (Attorney Docket No. EL001RH-3 filed on Apr. 18, 1996) in the names of Robert L. Heimann et al., and entitled "Corrosion Resistant Buffer System for Metal Products", which is a continuation in part of Non-Provisional U.S. patent application Ser. No. 08/476, 271 (Attorney Docket No. EL001RH-2 filed on Jun. 7, 1995) in the names of Heimann et al., and corresponding to WIPO Patent Application Publication No. WO 96/12770, which in turn is a continuation in part of Non-Provisional U.S. patent application Ser. No. 08/327,438, now allowed (Attorney Docket No. EL001RH-1 filed on Oct. 21, 1994).

The subject matter of the instant invention is also related to copending and commonly assigned Non-Provisional U.S. patent application Ser. No. 09/016849 (Attorney Docket No. EL004RH-1), filed on Jan. 30, 1998 and entitled "Corrosion Protective Coatings".

The disclosure of the previously identified patent applications and publications is hereby incorporated by reference.

DETAILED DESCRIPTION

A lubricating grease is defined by National Lubricating Grease Institute (NLGI) as "a solid to semifluid product of dispersion of a thickening agent in a liquid lubricant. Additives imparting special properties may be included", e.g., refer to the Lubricating Grease Guide, 4th ed.; NLGI; Kansas City, Mo.; p. 1.01; the disclosure of which is hereby incorporated by reference. For purposes of this invention, the terms grease and gel are used interchangeably wherein the term varies as a function of its application, e.g., dynamic greases or static gels. Typically, greases and gels fall broadly within the following formula:

| | |
|---|---|
| Base Oil | 45–90% |
| Thickener | 5–25% |
| Additives | 1–30% |

In an aspect of the invention, the inventive composition can comprise a gel which forms a self-supporting outer layer or skin. This type of gel has the capability of forming an outer layer or skin for the purpose of providing improved characteristics such as a-tack-free gel surface and resistance against washing away by rain or immersion. The outer skin can be achieved by any suitable means such as adding cross-linking polymers to the inventive composition. Examples of desirable methods for achieving cross-linking in the inventive composition include: 1) employing drying oils that exhibit an oxidative type curing mechanism, 2) by utilizing a moisture curing mechanism, 3) a reactive cure, 4) catalytic or non-catalytic ultra-violet (UV) cure, 5) heat curing mechanism, among other chemistries. Depending upon the chemistry and environment, the selected method can be employed to obtain results that range from forming a self-supporting layer to hardening the entire inventive composition. Normally, the self-supporting layer is about 0.001 to about 0.05 inch thick depending on application. A cross-linking polymer system can be added to any base oil so long as the polymer to be crosslinked is partially miscible in the base oil, the crosslinked layer or a hardened composition is resistant to the base oil and the system is compatible with the remaining components of the inventive composition. Examples of suitable base oils include at least one member from the group of naphthenic and paraffinic mineral oils, and synthetic oils such as polyalfaolefins, silicones, phosphate esters, fluorinated oils, polybutenes, polyalkylene glycols, alkylated aromatics, among others. Conventional drying oils can also be used to form a self-supporting layer or skin, e.g., linseed oil, and the oxidative curing can be accelerated by metallic catalysis such as cobalt naphthenate. Polymers such as oil modified epoxies or polyurethanes may also be utilized, e.g., Ketimine type moisture curing epoxy resin. While the amount of cross-linking polymer can be tailored to obtain the desired affect, typically the polymer corresponds to about 0.010 to less than about 50 wt. % of the inventive composition, depending on compatibility between the polymer and the gel base oil. At loadings greater than 50% the composition becomes increasingly like the polymer itself and gel-like characteristics decrease.

In a another aspect of the invention, the physical characteristics of the gel as applied are retained for an extended period, e.g., the gel is substantially non-crosslinked or lacking a self-supporting layer. In this aspect of the invention, the base oil of the grease/gel can comprise a polymer such as a polyurethane or an epoxy and an oil such as linseed or a drying oil. Without wishing to be bound by any theory or explanation, it is believed that employing a relatively large amount of oil inhibits crosslinking in the polymer thereby causing the gel to retain its as applied characteristics.

Moreover, the previously described polymer/drying oil combination can be employed as components in a non-toxic oil based gel, e.g., based upon polybutene, polyalphaolefin, lanolin, mixtures thereof, among others. The polymer component of the inventive composition serves to improve the composition's adhesion and/or cohesion to a metal surface. Without wishing to be bound by any theory or explanation, it is believed that the drying oil component, e.g., linseed oil, forms a reticulating or interpenetrating network among the oil and polymer components of the inventive composition. While this aspect of the invention can be employed in a wide of end-uses, this aspect of the invention is particularly useful in reducing pipe corrosion under insulation. If employed under pipe insulation, clean up or removal of the composition can be achieved by using commercially available citrus-based cleaners.

The pH of the grease can be tailored to be compatible with the metal surface which is contacted with the grease or gel. That is, certain metals and alloys can become susceptible to caustic cracking when exposed to a relatively high pH, e.g., about 10 to about 14. In such cases, it may be appropriate to employ an alkali silicate such as sodium silicate with another silicate such as calcium silicate. Without wishing to be bound by any theory or explanation, the mechanism of protection follows the laws of chemical absorption and chemical affinity when the grease or gel contacts the surface being protected. The inventive grease will typically have a pH that ranges from about 7 to about 14. It is also believed that the presence of a relatively high pH in the grease can hydrolyze, for example, zinc borate and silica, and equipotentialize the surface being protected. Depending upon the composition of the grease or gel and surface being protected, one or more components of the grease or gel can react with each other and/or the underlying surface to form a protective layer or film, e.g., when the inventive grease or gel is applied to a zinc containing surface a unique surface comprising an alkali zinc silicate crystallites within an amorphous phase composition can form.

Normally, a silicate will be employed as a thickener as well as a corrosion inhibitor. The silicates used for preparing the inventive grease/gel that is employed in lubricating applications such as working wire ropes are normally finely ground by milling the raw material or the final composition, e.g., milled to a particle size of about 1 to about 20 microns and in some cases less than 200 mesh. Suitable silicates for working wire ropes among other applications can be selected from the group consisting of sodium silicate, calcium silicate, potassium silicate, lithium silicate, ammonium silicate, (each with various amounts of moisture of hydration and various ratios of silica to cations such as Na+, NH4, among others), mixtures thereof, among others, and can be mixed together by any suitable means. The aforementioned silicates can be combined with or, in some cases, replaced by molybdates, phosphates, zirconates, titanates, vanadates, permanganates, pertechnetate, chromate, tungstate, nitrate, carbonates, aluminates, ferrates, mixtures thereof among others. To this silicate mixture, can be added at least one of a surfactant, coupling agent and at least one dispersion oil that are compatible with the base oil of the grease, e.g., silicone oil, PAO or polybutene, thereby forming an intermediate product. Typically, the coupling agent will comprise about 0.1 to about 2 wt. % of the grease and can be at least one member selected from the group consisting of organotitanates, organozirconates, organoaluminates and organophosphates. Surfactants include ethoxylates, pine oil, pine oil derivatives, tall oil, tall oil derivatives, acetylenic diols, long chain fatty acids, sulfosuccinates, alkyl sulfates, phosphates, sulfonates, long chain amines, quaternary ammonium compounds, organosilicons, fluorinated surfactants, mixtures thereof, among others. A suitable dispersion oil can be at least one member from the group consisting of linseed, boiled linseed, castor, canola, mineral, olive, peanut, sunflower, corn, soybean, cedar, pine, coconut, tung, vegetable, rapeseed, olive, jojoba, lanolin, meadow foam, cottonseed, sesame, palm, mixtures thereof, among others, and normally comprise about 1 to about 40 wt. % of the grease. In the case of lanolin, the amount of dispersion oil normally corresponds to about 5 to at least 10 wt. %.

The previously described intermediate product can be dispersed or mixed with the remaining components of the grease, e.g, base oil, extreme pressure additive, among others. By adding the intermediate product to the remaining components, a corrosion resistant grease is obtained.

The aforementioned inventive intermediate product can be introduced into any suitable type of grease or gel such as:

1) Soap-Thickened Greases/Gels

Aluminum Soap Grease

Hydrated Calcium Soap Grease

Anhydrous Calcium Soap Grease

Sodium Soap Grease

Lithium Soap Grease

2) Soap-Complexed Greases/Gels

Aluminum Complexed Grease

Calcium Complexed Grease [the amount of alkaline silicates that can be added to calcium complexed grease is relatively low in comparison to other greases]

Barium Complexed Grease

Lithium Complexed Grease

3) Non-Soap Greases/Gels

Mineral Oil Based Grease

Vegetable Oil Based Grease

Organo-Clay Grease

Polyurea Grease

Polyurea Complexed Grease

The thickener utilized in the soap-based greases is typically a saponification reaction product that is generated during the grease-making process. The saponification reaction can occur among at least one of the following components long-chained fatty acids, e.g. stearic acid, oleic acid, among others; fat, e.g., beef tallow; and an alkali component, e.g., aluminum, calcium, sodium, lithium hydroxide, among others. The aforementioned alkali component is normally used in a slight excess to facilitate driving the saponification reaction and to neutralize any remaining free acid. As the saponified product is cooled, the product can form a fibrous network through the base oil, e.g., a mineral or hydrogenated castor oil, thereby thickening the grease. For best results, the fatty acid or fat component is compatible with the base oil, the appropriate amount of thickener is employed, and the saponification reaction occurs at relatively dispersed locations within the base oil. For example, the aforementioned fibrous network may not be adequate if the saponification is conducted separately and then mixed into the base oil. Finally, the rate of cooling and amount of water present can impact the fibrous network formation rate.

A soap complexed grease is similar to the soap-thickened grease in that both types of greases rely upon the saponification reaction. However, the soap complexed greases have an additional reactant which becomes a component of the saponified product and facilitates forming the fibrous networks. The complexing or chelating reactant is normally a metal salt of a short chained organic acid, e.g., a calcium acetate, or a metal salt of an inorganic acid, e.g., lithium chloride. (The grease may also contain aluminum atom(s) which were part of the organic soap molecules, e.g. aluminum distearate and aluminum hydroxide) Total thickener contents, respectively, of the calcium, aluminum, and lithium complex greases are about 25 to about 35 wt. %, about 5 to about 9 wt. %, and about 12 to about 18 wt. %. In one aspect of the invention, the thickening soap may comprise sulphurized-phosphorized lard oil in lithium grease. This thickening soap can also function as an extreme pressure additive within the grease.

Non-soap based greases do not require the previously described saponification reaction to thicken the grease. Non-soap greases employ physical additives for thickening. While any suitable thickener can be employed, an example of a suitable thickener is organo-clay particles, or platelets of small organic or inorganic particles dispersed within the base oil. Further examples of thickeners comprise at least one of bentonite clay, famed silica (aerogel), carbon black, powdered plastics, mixtures thereof, among others. In addition, surface modified thickeners may also be utilized. Normally, the thickener has a large surface area and typically a certain amount of an oil absorption capability.

Polyurea and polyurea complexed greases are related to the soap based greases in that reactions polymerize component materials, e.g., isocyanates and amines, to form the thickener, e.g., polyurea. However, the polyurea normally does not form fibrous networks to the extent of soap based greases. The complexed polyureas utilized the same types of complexing agents as the complexed soap based greases.

The following types of additives may be incorporated into greases or gels to achieve a variety of desired properties: rust inhibitors, antioxidants, soaps, odor modifiers, tackiness agents, structure modifiers, metal deactivators or corrosion inhibition for non-ferrous metals, solid lubricants (such as graphite, zinc oxide, borax, among other conventional solid lubricants), phosphate esters, polytetrafluoroethylene, dithiophosphates, dithiocarbonates, antimicrobial agents, mixtures thereof, among other suitable additives. Examples of suitable rust inhibitors comprise at least one member selected from the group consisting of fatty acids, sulfonates, amines or amine phosphates, amides of fatty acids, succinates, benzotrizoles, tolutriazoles, mercaptobenzothiazole, thiadiazoles, metal carboxylates, mixtures thereof, among others. Examples of suitable antioxidants comprise at least one member selected from the group consisting of aromatic amines, hindered phenols, diphenylamine, phenyl alpha-naphthylamine, 2,6-di-t-butylphenol, phenothiazine, alkylated diphenylamines, alkylated phenyl alpha-naphthylamines, 2,6-di-t-butyl-p-cresol (BHT), polymeric BHT, peroxide decomposers, mixtures thereof, among others to inhibit natural or high temperature oxidation of the composition. The formulation can also include additives to improve ultraviolet (UV) light stability such as Tinuvin (Ciba Geigy), a substituted hydroxyphenyl benzotriazole. Examples of soaps include lithium stearate, aluminum stearate, calcium stearate, or zinc stearate. Soaps may be utilized to impart added lubricity, heat resistance, or moisture resistance. Examples of suitable tackiness agents comprise at least one member selected from the group consisting of high molecular weight hydrocarbons, rubber latex, polybutenes, estergums and terpene resins mixtures thereof, among others. Examples of suitable structure modifiers comprise at least one member selected from the group consisting of glycerol, alcohols, glycols, fatty acids, water, alkali sufonaphthenates, mixtures thereof, among others. Examples of suitable anti-microbial agents comprise at least one member selected from the group consisting of zinc borate, silver, quaternary ammonium compounds, mixtures thereof, among others. Other environmentally less desirable anti-microbial compounds include compounds of mercury, tin, antimony, and mixtures thereof The additives can also comprise at least one member selected from the group consisting of surfactants, wetting agents, surface active agents, pine oil, derivatives, tall oil and derivatives, ethoxylates, acetylenic diols, silicones, silanes, fatty oils or acids with a phosphate adduct, sulfurized fatty oils, molybdenum disulfide, tungsten disulfide, mixtures thereof, among others. The total amount of these additives normally does not accumulate to more than about 5 wt. % of the total grease formulation. The inventive composition can also include a substance for imparting conductivity to the composition such as graphitic carbon, conductive polymers, metal powder or flake mixtures thereof, among others. The amount of conductive component normally ranges from about 15 to about 45 wt. % of the inventive composition.

While the inventive grease/gel can provide a physical barrier from a corrosive environment, the grease can also supply a silica/silicate product that imparts the previously described corrosion-inhibiting properties. Depending upon the composition of the metal surface, composition of grease/gel applied to the surface, temperature and length of time the composition is in contact with the metal surface, surface pH, at least a portion of the grease can interact with the metal surface. The interaction can produce a mineral-like surface coating, e.g, less than about 100 Angstroms thick, characterized by unique crystallites, e.g, an alkali zinc silicate, within an amorphous matrix. A more detailed description of mineral layers and precursors thereof can be found in the aforementioned copending and commonly assigned U.S. patent applications; the disclosure of which was incorporated by reference.

While the inventive grease can be employed in connection with a virtually unlimited array of surfaces, desirable results have been obtained when the grease is employed upon a zinc containing surface or alloy. The inventive grease can be employed in a virtually unlimited array of applications such as upon pipe in order to inhibit corrosion under insulation, wire rope and strand products during manufacture or afterwards by injecting the grease, and applied to the exterior armor/sheathing of electrical and optical fiber cables that are exposed to marine environments as well as mechanical force cables such as those employed in automobiles, boats and aircraft. The invention is also useful in cable applications where RFI-EMI properties are important such as some undersea cables. The inventive grease can also be employed as cutting/buffing/grinding fluids for ceramics/metals, protect and lubricate lead alloy battery terminals, protect and lubricate lock assemblies, and protect coiled metal rolls or stack metal sheet from corrosion, among many other applications where corrosion resistance and/or lubrication are useful. The inventive greases or gels can be employed in single or multiple layers having chemically similar or distinct chemical compositions, e.g., employing one composition as a pre-coat or primer for another composition. The inventive greases or gels can be applied to the above users via spray, trowel, glove, brush, immersion, pressure injection, or pumping.

The following Examples are provided to illustrate not limit the scope of the invention as defined in the appended claims.

EXAMPLE 1

The formulation listed below in Table 1 was produced by adding powdered materials to the PAO base oil, i.e., polymerized 1-decene. The PAO oil was poured into a 1 quart stainless steel bowl. The powdered materials were then added to the PAO and mixed by hand.

TABLE 1

| COMPONENT | SUPPLIER | AMOUNT % BY WT. |
|---|---|---|
| PAO base oil | Nye Lubricants | 53.5% |
| Silica | Nye Lubricants | 9.8 |
| G sodium silicate | PQ Corp. | 30.0 |
| Zinc Borate | U.S. Borax | 5.0 |
| p-Hydroxy Aniline | Mallinckrodt Chemical | 0.7 |
| Indigo Blue Dye | Tricon Colors Inc. | 1.0 |

This composition, when applied to a standard ACT electrogalvanized steel test panel (E60 EZG 60G 2 side 03×06× 030) to a thickness of 1/16 inch, protects from red corrosion for a minimum of 1000 hours in accordance with ASTM B117 salt spray exposure. When the composition was removed from the panel after a minimum of 24 hours by carefully scraping off the excess and then washing with naphtha, an average of 192 hours of ASTM B117 salt spray exposure was obtained prior to the appearance of red corrosion products compared to 120 hours for untreated control samples.

Depending upon the surrounding environment, improved corrosion resistance can be obtained by omitting p-Hydroxy Aniline. Further, the corrosion resistance of a PAO based grease or gel can be improved by the adding at least one of sodium molybdate, sodium carbonate, and sodium silicate.

EXAMPLE 2

A second formulation substantially the same as that described in Example 1 was prepared with the exception that p-Hydroxy Aniline was omitted. The removal of the p-Hydroxy aniline improved the environmental acceptability of the formulation without adversely impacting the corrosion resistant properties of the grease.

A third formulation was prepared by omitting the zinc borate. While silica was employed as a thickener, e.g., refer to the Standard Base Formulation in Table 2 below, the presence of silica and a silicate can have a desirable combined effect upon the corrosion resistant properties of the grease. Zinc borate functions as a fire retardant and a microbiological inhibitor and, therefore, can be removed with its attendant properties.

EXAMPLE 3

The following formulas were produced to compare the corrosion resistance of the inventive greases to a base formulation.

TABLE 2

| COMPONENT | SUPPLIER | AMOUNT (WT %) |
|---|---|---|
| --BASE FORMULATION-- | | |
| PAO | Durasyn 174 (Amoco Oil Co.) | 88.4% |
| silica | Cabosil TS720 (Cabot Corp.) | 11.1% |
| dye | T-17N Dye (DayGlo Color Corp) | 0.5% |
| --CORROSION RESISTANT FORMULATION 1-- | | |
| PAO | Durasyn 174 (Amoco Oil Co.) | 57.3% |
| PAO | Durasyn 166 (Amoco Oil Co.) | 14.3% |
| silica | Cabosil TS720 (Cabot Corp.) | 7.3% |
| zinc borate | Borogard ZB (U.S. Borax) | 4.1% |
| sodium silicate | G Grade (PQ Corp.) | 16.3% |
| indigo blue dye | Tricon Color Corp. | 0.7% |

TABLE 2-continued

| COMPONENT | SUPPLIER | AMOUNT (WT %) |
|---|---|---|
| --LUBRICATIVE FORMULATION 1-- | | |
| PAO | Durasyn 174 (Amoco Oil Co.) | 58.4% |
| polytetrafluoroethylene | Fluro 300 (Micro Powders Inc.) | 40.9% |
| indigo blue dye | Tricon Color Corp. | 0.1% |
| organo zirconate | Ken-React NZ-12 Kenrich Petrochemical, Inc. | 0.6% |
| --CORROSION RESISTANT FORMULATION 2-- | | |
| silicone oil | Dow Corning 200 | 75% |
| silica | Cabosil TS729 (Cabot Corp.) | 15% |
| sodium silicate | G grade (PQ Corporation) | 10% |

Corrosion Formulation 1 was prepared by mixing the zinc borate and sodium silicate together in the manner described in Example 1. The borate/silicate blend was added to Durasyn 166 PAO. The silica was mixed with Durasyn 174 PAO. The two PAO mixtures were then combined. The dye was then added to the combined PAO mixtures.

Lubricative Formulation 1 was prepared by first treating the Fluoro 300 with a 2.3 weight % solution of NZ-12 in 2-propanol, and allowing the 2-propanol to evaporate. The treated Fluoro 300 was then mixed into the Durasyn 174 by hand. After thorough mixing, the Indigo blue dye was introduced. While both Formulations have a wide range of uses, Lubricative Formulation 1 is particularly useful as an emergency or a parking brake cable lubricant.

Corrosion Formulation 2 was formed substantially in the same manner as Corrosion Resistant Formulation 1. If desired, the sodium silicate of the previously identified Formulations can be mixed with or substituted for calcium silicate, trisodium phosphate, sodium bicarbonate, among others, in order to obtain a grease/gel with a lower pH. Further, if desired the sodium silicate can be at least partially replaced by polytetrafluoroethylene to improve its lubricative properties.

EXAMPLE 4

Corrosion Resistant Formulation No. 1 was coated upon a standard ACT electrogalvanized steel test panel (E60 EZG 60G 2 side 03×06×030) by applying an excess and smoothing with a gate type applicator to leave a 1/16 inch thick layer. The grease/gel remained in contact with the test panel for a period of about 24 hours. The grease/gel was removed from one-half of the test panel by light scrapping and washing with naphtha.

The test panels were then tested under a salt spray environment in accordance with ASTM Procedure B117. The area where the coating had been removed lasted about 216 hours before 5% of the surface area was covered with red rust. The grease/gel coated area of the test panel had no visible red rust after 1,000 hours of salt spray exposure.

EXAMPLE 5

The following formula was prepared and applied to an outdoor above ground piping which was subsequently covered with an external layer of insulation.

| COMPONENT | SUPPLIER | AMOUNT |
|---|---|---|
| Polyalfaolefin Base Oil | Durasyn 174/Amoco Oil Co. | 81.7 wt. % |
| Silica | Cabosil TS-720/Cabot Corp. | 4.7% |
| Synthetic Calcium | Hubersorb 600/J.M. Huber Corp. | 11.7% |
| Silicate | | |
| Polybutene Based Tackifier | IdaTac M256/Ideas, Inc. | 1.5% |
| Dye | Indigo/Tricon Color Corp. | 0.4% |

The Hubersorb 600 and Cabosil TS-720 were dry mixed together in a covered 5 gallon pail for 5 minutes and then the mixed composition was added to the Durasyn 174 base oil in successive additions until all the powder had been added. The resulting mixture was then mixed for an additional 20 minutes.

After combining the Durasyn, IdaTac M256 was added volumetrically from a syringe and mixing was continued for 15 minutes. Finally, the Indigo dye was added and the composition was mixed for an 15 additional minutes.

The final composition had a penetration number of 317 as determined in accordance with ASTM-D217. The resulting composition was applied to a standard cold roll steel panel in a clean/unpolished condition to obtain a film thickness of 1/16 inch. After 24 hours of exposure to salt spray in accordance with ASTM B-117 no corrosion had occurred beneath the film.

The composition was also applied to a rusted 2.5 inch diameter steel pipe that had been wire brushed to remove loose scale. The film was applied to approximately 1/16 inch thickness and the pipe was not covered with insulation. After 4 weeks of outdoor exposure (including rain and wind events) no noticeable degradation, or loss of coated material from the pipe was observed.

EXAMPLE 6

The above formulation for CUI application is adapted for use on an automotive/industrial battery terminal to control the corrosion of battery posts. A battery terminal corrosion protectant is prepared by removing the indigo dye and adding up to about 30% by weight conductive carbon black to the aforementioned composition. (the conductive material will provide a dark color).

EXAMPLE 7

Amounts of Cabosil TS-720, Hubersorb 600, Lithium Hydroxystearate, S-395-N5 and Ackrochem 626 were measured out in quantitites sufficient to prepare a 350 g. total batch. These powders were then dry mixed and then added to the Lubsnap 2400 oil which had been preheated to 110° C. The compositon was then mixed with a Premier Mill Series 2000 Model 84 Laboratory Dispersator at N3000 rpm utilizing a 2-inch ZNOCO Desron dispersion blade for 15 minutes. At this time the Lubrizol 3108 and Tallicin 3400 was added and mixed for another 15 minutes. A composition containing the following components was prepared in accordance with Example 1, and used to protect wire rope and stranded cables:

| COMPONENT | SUPPLIER | AMOUNT |
|---|---|---|
| Napthenic Mineral Base Oil | Lubsnap 2400/Tulco Oils Inc. | 67.5% |
| Silica | Cabosil TS-720/Cabot Corp. | 6.3% |
| Synthetic Calcium Silicate | Hubersorb 600/J.M. Huber Corp. | 16.2% |
| Lithium Hydroxystearate | Witco Corp. | 2.5% |
| Polyisobutylene | Indopol H-100/Amoco | 2.5% |
| Wetting Agent** | Additive 3108/Lubrizol Corp. Tallicin 3400/Pflaumer Brothers, Inc. | 2.5% |
| Micronized Polyethylene | S-395-N5/Shamrock Inc. | 2% |
| Blue Dye | Ackrochem 626/Ackron Chemical Co. | 0.5% |

**Tallicin 3400 is sold commercially as being a proprietary compositions. Examples of other suitable wetting agents comprise at least one member selected from the group consisting of pine oils, tall oil, pine oil derivatives, tall oil derivatives, mixtures thereof, among others.

EXAMPLE 8

The following formula was prepared in accordance with Example 1, and applied to a steel panel to form an outer self-supporting layer that was subsequently covered with an external layer of wollastonite insulation:

| COMPONENT | SUPPLIER | AMOUNT |
|---|---|---|
| Polyalfaolefin Base Oil | Durasyn 174/Amoco Oil Co. | 51.6% |
| Linseed Oil | commercial | 30.0% |
| Cobalt Naphthenate | commercial | 0.1% |
| Silica | Cabosil TS-720/Cabot Corp. | 4.7% |
| Synthetic Calcium Silicate | Hubersorb 600/J.M. Huber Corp. | 11.7% |
| Polybutene Based Tackifier | IdaTac M256/Ideas, Inc. | 1.5% |
| Dye | Indigo/Tricon Color Corp. | 0.4% |

EXAMPLE 9

The benefit of adding polymer to an inventive composition was demonstrated by adding a polymer gel to a base gel formula that was prepared in accordance with Example 1 and has the following formula:

| BASE GEL | | |
|---|---|---|
| COMPONENT | SUPPLIER | AMOUNT |
| Polyalfaolefin Oil | Durasyn 174 (Amoco) | 55.2 wt. % |
| Fumed Silica | Cabosil TS-720 (Cabot Corp.) | 9.8 wt. % |
| Sodium Silicate | G Grade (PQ Corp.) | 30 wt. % |
| Zinc Borate | Borogaro ZB (U.S. Borax) | 5 wt. % |

Polymer Gel

Polyurethane polymer was added to the gel by mixing ACE .16381 Polyurethane Clear Finish (supplied by Westlakes) with the aforementioned base gel in a 1:15 ratio by weight respectively. The gel and polymer compositions were mixed with a spatula for approximately 15 minutes to form a homogeneous mixture. Standard 0.032 in.×3 in.×6in. cold roll steel panels (supplied by ACT) were coated with a 0.05 inch thick layer over a 4 inch by 3 inch area. One panel was coated with the Base Gel Formula and one panel was coated with the Polymer Gel containing Formula.

In order to illustrate the effectiveness of the polymer gel formula to protect metal surfaces from corrosion under insulation, a piece of wollastonite mineral pipe insulation (approximately 0.25 inches×1.5 inches×5 inches) was placed on each gel coated panel with the broad surface contacting the gel. A 71 gram weight was placed on top of each piece of insulation and the panels were allowed to sit at ambient conditions for 48 hours. At 48 hours, the weight and insulation was removed and the following observations and measurements were made.

| GEL TYPE | INITIAL WEIGHT (g) OF INSULATION | FINAL WEIGHT (g) OF INSULATION | OIL ABSORPTION (g) INTO INSULATION |
|---|---|---|---|
| Base Gel | 8.085 | 9.4412 | 1.356 g. |
| Polymer Gel | 7.562 | 7.673 | 0.111 g. |

The layer of Base Gel beneath the insulation was visibly observed to have cracks or separations in the gel due to oil loss from the gel, e.g., the oil was absorbed by the adjoining insulation. In contrast, no cracks were noted in the polymer containing gel composition. As illustrated above, the polymer gel reduced oil loss or migration into the insulation to less than one tenth of the loss that the Base Gel exhibited.

This Example was repeated by replacing the polyurethane polymer with epoxy resins supplied by Reichhold Chemical as EPOTUF 690 and 692. The amount of epoxy was 20 wt. % of the total composition.

EXAMPLE 10

A substantially biodegradable formulation having the following formulation was prepared:

| COMPONENT | SUPPLIER | AMOUNT |
|---|---|---|
| Polyol Ester | Emkarate 1950/ICI Chemicals | 67.5 wt. % |
| Fumed Silca | TS-720 /Cabot Corp. | 5.4 wt. % |
| Calcium silicate | Hubersorb H-600/J.M. Huber Corp. | 3.6 wt. % |
| Lithium Stearate | Witco Corporation | 14.3 wt. % |
| polyethylene | S-395-N5 /Shamrock Technologies | 3.6 wt. % |
| polybutene | Indopol H-300/Amoco Chemical | 3.6 wt. % |
| hydrated lime | Mississippi Lime Co. | 2.0 wt. % |

A 350 gram batch of the above composition was prepared by heating the Emkarate 1950 base oil to a temperature of 110° C., and then mixing in the pre-mixed powdered components of the grease in a Premier Mill Series 2000 Model 84 Laboratory Dispersator at N3000 rpm utilizing a 2 inch INDCO Design D dispersion blade for 15 minutes. Finally, the Indopol H-300 polybutene was added and the composition was mixed for another 15 minutes. After allowing the composition to cool to room temperature, the penetration in accordance with ASTM-D217 was measured and determined to be 277.

Three standard 0.032 in.×3 in.×6 in. cold roll steel panels (ACT Laboratories) were rinsed with Naphtha and wiped with a Kimwipe prior to applying 2.25 grams to the entire front panel surface (N 0.008 in. thick) with a Micrometer gate applicator. The coated panels were exposed to salt spray conditions (20% aqueous sodium chloride solution) as established in MIL-G-18458B for 10 days. After 10 days, the grease was wiped off and the panels were inspected for red corrosion farther than 0.25 inches from the edges of the panel. Each panel had less than 7 corrosion spots which exceeded 1 mm in diameter, and surface coverage by corrosion did not exceed 5%.

EXAMPLE 11

The following Example demonstrates that certain naturally occurring base oils are combinable with synthetic base oils. This Example also illustrates formation of a coating/film having a relatively firm or self-supporting outer surface and uncured material underlying the outer surface. The following compositions were prepared by in accordance with Example 7.

| AMOUNT | COMPONENT | SUPPLIER |
|---|---|---|
| -COMPOSITION A- | | |
| 55–60/28–30 wt. %2:1 ratio | Linseed oil/PAO | ADM/Amoco |
| 0.75–1.0 wt. % | calcium silicate-Hubersorb 600 | J.M. Huber Corp |
| 2.0 wt. % | amber wax-Bareco Ultraflex | Bareco-Petrolite |
| 6–8 wt. % | fumed silica-Cabosil 610 | Cabot Corp. |
| -COMPOSITION B- | | |
| 55–60/28–30 wt. %2:1 ratio | Linseed oil/PAO | ADM/Amoco |
| 0.75–1.0 wt. % | calcium silicate-Hubersorb 600 | J.M. Huber Corp |
| 5.0 wt. % | amber wax-Bareco Ultraflex | Bareco-Petrolite |
| 6–8 wt. % | fumed silica-Cabosil 610 | Cabot Corp. |

These compositions were applied by using a drawdown gate onto an ACT steel test panel. The composition formed a coating/film in about 24 hours by drying under ambient conditions. The characteristics of the coating/film were an outer self-supporting and resilient layer. The portion of the coating/film between the outer layer and test panel remained uncured in a substantially unchanged physical state. When applied to the test panel the coating/film imparted enhanced corrosion resistance to panel, in that the outer layer is water resistant and repellent while the underlying uncured portion inhibits the ability for corrosive materials to attack the panel.

The corrosion resistance of the coating/film was demonstrated in accordance with ASTM Test No. B-117 (salt spray) and D2247 (humidity). Test panels coated, respectively, with compositions A and B were tested together at 500 hrs., 750 hrs., and 1000 as per ASTM B-117. The outer self-supporting layer remained intact, was not penetrated by corrosion material, and remained flexible. The portion of the coating/film under the outer layer remained gel-like after 1,000 hrs of salt exposure. No rust was observed via visual detection after 1,000 hours of ASTM B-117 testing.

Test panels coated, respectively, with Compositions A and B were tested at 1000 hrs as per ASTM D2247. Results similar to the previous ASTM B- 117 were obtained; except that the outer layer was more flexible. No rust was observed via visual detection after 1,000 hours of ASTM D2247 testing.

In addition to corrosion resistance, panels coated with Composition B were evaluated for temperature and pressure resistance. In test two panels were coated with Composition B, allowed to cure for 48 hrs. under ambient conditions and placed into an All American brand Model No. 25X pressure sterilizer, manufactured by Wisconsin Aluminum Foundry Co., at 240 F. and 2X atmospheric pressure for a period of 24 hrs. The only visually detectable affect was an increased darkening of the outer self-supporting layer. The temperature and pressure resistance of a panel coated with Composition B that had undergone 750 hrs. in the ASTM B 117 Salt Spray was also evaluated. Similar to the aforementioned results, the only reportable change was a darkening of the outer self-supporting layer.

EXAMPLE 12

This Example illustrates a composition, which includes synthetic and naturally occuring oils, that forms a self-supporting layer. The following composition was prepared by Example 7:

| COMPONENT | SUPPLIER | AMOUNT |
|---|---|---|
| Linseed oil | ADM | 50–60 wt. % |
| polybutene | Indopol H-50/Ideas Inc. | 20–30 wt. % |
| calcium silicate | Hubersorb 600/Huber Corp. | 2–8 wt. % |
| wax | Ultraflex Amber Wax (Bareco Petrolite) | 0–4 wt. % |
| filmed silica | TS610 or TS720 (Cabot Corp.) | 5–8 wt. % |
| polyethelene | S-395-N5 (Shamrock Tech.) | 0–4 wt. % |

The viscosity and tackiness properties of the above composition can be improved by adding about 1–4 wt. % lithium stearate, e.,g., such as that supplied by Reagens of Canada. The lithium stearate can be added to the composition by being introduced and admixed along with the other components of the composition.

EXAMPLE 13

This Example illustrates a non-migrating composition that can be employed to reduce, if not eliminate, corrosion under insulation and can be applied to a wet surface. The following composition was prepared by Example 7:

| COMPONENT | SUPPLIER | AMOUNT |
|---|---|---|
| Polybutene | Indopol H-50 - Ideas Inc. | 54–64 wt. % |
| Epoxy Resin | EP08YF 692 - Reichhold Chemical | 15–25 wt. % |
| Fumed Silica (Cab-o-sil) | TS720 - Cabot Corp. | 3–8 wt. % |
| Calcium Silicate | Hubersorb 600 - Huber Corp. | 4–10 wt. % |
| Lithium Stearate | Reagens - Reagen Co. Canada | 4–10 wt. % |

The above composition was applied to a wet metallic substrate (test panel) without adversely impacting the adhesion to the substrate. The composition was also applied to a metallic substrate while the substrate was immersed in water. The characteristics of the composition can be tailored by incorporating heat-bodied linseed oil, e.g., about 5 to about 10 wt. % of OKO-S70 supplied by ADM Corp. If desired, about 5 to about 10 wt. % silicone resin could also be incorporated into the composition, e.g., the silicone supplied by GE (General Electric) of Waterford N.Y.

EXAMPLE 14

The following Example demonstrates formation of the previously described mineral layer as a result of a component of the grease/gel interacting with the surface of galvanize metal substrates. The interaction was detected by using ESCA analysis in accordance with conventional methods.

Analytical conditions for ESCA

| Instrument | Physical Electronics Model 5701 LSci |
|---|---|
| X-ray source | Monochromatic aluminum |
| Source power | 350 watts |
| Analysis region | 2 mm × 0.8 mm |
| Exit angle* | 50° |
| Electron acceptance angle | ±7° |
| Charge neutralization | electron flood gun |
| Charge correction | C—(C,H) in C 1s spectra at 284.6 eV |

*Exit angle is defined as the angle between the sample plane and the electron analyzer lens.

Coatings were made up based on the ingredients and formulation methods shown in Example 10. Different base oils and base oil combinations, alkali silicate types, silicate amounts, and substrates were used to represent a cross section of possible ranges. The different base oils comprised polyalphaolefin (polymerized 1-decene) and linseed oil. Two types of alkali silicates were also used, sodium and calcium silicate. The concentration of the alkali silicate was also varied from 1% to 50% wt to show the range of possible concentrations. Each set of coatings were applied onto both cold rolled and galvanized steel panels.

Each formulation was mixed together and applied onto the given substrate at a thickness between 5 and 10 mils. The coatings were allowed to set for at least 24 hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

| Formulations used for ESCA/XPS analysis | | | | | | | | |
|---|---|---|---|---|---|---|---|---|
| Sample# | 1 | 2 | 3 | 4 | 5 | 6 | 7 | 8 |
| Durasyn 174 wt. % (PAO) | 49.3 | 44.3 | 49.3 | 44.3 | 87 | 79.2 | 70.4 | 44 |
| Linseed Oil wt. % | 49 | 44 | 49 | 44 | 0 | 0 | 0 | 0 |
| Fumed Silica wt. % | 0.7 | 0.7 | 0.7 | 0.7 | 12 | 10.8 | 9.6 | 6 |
| Sodium silicate wt. % | 1 | 10 | 0 | 0 | 0 | 0 | 20 | 50 |
| Calcium silicate wt. % | 0 | 0 | 1 | 10 | 1 | 10 | 0 | 0 |

ESCA was used to analyze the surface of each of the substrates. ESCA detects the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2p) binding energy (BE) in the low 102 eV range, typically between 102.1 to 102.3. The silica can be seen by Si(2p) BE between 103.3 to 103.6 eV. Higher binding energies (>103.8 eV) indicate precipitated silica due to the charging effect of the silica which has no chemical affinity to the surface. The resulting spectra show overlapping peaks, upon deconvolution reveal binding energies in the ranges representative of metal silicate and silica.

EXAMPLE 15

The following Example demonstrates formation of the previously described mineral layer as a result of a component of the grease/gel interacting with the surface of lead substrates. The interaction was detected by using ESCA analysis in accordance with conventional methods.

Coatings were made up based on the ingredients shown in table shown below. Different alkali silicate types and silicate amounts were used to represent a cross section of possible ranges. Two types of alkali silicates were also used, sodium and calcium silicate. The concentration of the alkali silicate was also varied from 5% to 50% wt to show the range of possible concentrations. Each coatings was applied onto lead coupons. Prior to gel application, the lead coupons cut from lead sheets (McMasters-Carr) were cleaned of its oxide and other dirt by first rubbing with a steel wool pad. The residue was rinsed away with reagent alcohol and Kim wipes.

Each formulation was mixed together and applied onto a lead coupon at a thickness between 5 and 10 mils. The coatings were allowed to set for at least 24 hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

| Formulations used for ESCA/XPS analysis on lead panels | | | | |
| --- | --- | --- | --- | --- |
| Sample # | 1 | 2 | 3 | 4 |
| Durasyn 174 wt. % | 89 | 74 | 89 | 44 |
| Fumed Silica wt. % | 6 | 6 | 6 | 6 |
| Sodium silicate wt. % | 0 | 0 | 5 | 50 |
| Calcium silicate wt. % | 5 | 20 | 0 | 0 |

ESCA was used to analyze the surface of each of the substrates. ESCA detects the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2p) binding energy (BE) in the low 102 eV range, typically between 102.1 to 102.3. The silica can be seen by Si(2p) BE between 103.3 to 103.6 eV. The resulting spectra show some overlapping peaks, upon deconvolution reveal binding energies in the ranges representative of metal silicate and silica. The primary binding energy for all of these samples were in the range of 102.1 to 102.3 eV.

EXAMPLE 16

The following Example demonstrates formation of the previously described mineral layer as a result of a component of the grease/gel interacting with the surface of GALFAN® substrates (a commercially available alloy comprising zinc and aluminum). The interaction was detected by using ESCA analysis in accordance with conventional methods.

Coatings were made up based on the ingredients shown in table shown below. Different alkali silicate types and silicate amounts were used to represent a cross section of possible ranges. Two types of alkali silicates were also used, sodium and calcium silicate. The concentration of the alkali silicate was also varied from 5% to 50% wt to show the range of possible concentrations. Each coatings was applied onto galfan coated steel coupons. Prior to gel application, the galfan coupon, cut from galfan sheets (GF90, Weirton Steel), were rinsed with reagent alcohol.

Each formulation was mixed together and applied onto a GALFAN® coupon at a thickness between 5 and 10 mils. The coatings were allowed to set for at least 24 hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

| Formulations used for ESCA/XPS analysis on Galfan ® panels | | | | |
| --- | --- | --- | --- | --- |
| Sample # | 1 | 2 | 3 | 4 |
| Durasyn 174 wt. % | 89 | 74 | 89 | 44 |
| Fumed Silica wt. % | 6 | 6 | 6 | 6 |
| Sodium silicate wt. % | 0 | 0 | 5 | 50 |
| Calcium silicate wt. % | 5 | 20 | 0 | 0 |

ESCA was used to analyze the surface of each of the substrates. ESCA detection of the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2p) binding energy (BE) in the low 102 eV range, typically between 102.1 to 102.3. The silica can be seen by Si(2p) BE between 103.3 to 103.6 eV. The resulting spectra show some overlapping peaks, upon deconvolution reveal binding energies in the ranges representative of metal silicate and silica.

EXAMPLE 17

The following Example demonstrates formation of the previously described mineral layer as a result of a component of the grease/gel interacting with the surface of copper substrates. The interaction was detected by using ESCA analysis in accordance with conventional methods.

Coatings were made up based on the ingredients shown in table shown below. Different alkali silicate types and silicate amounts were used to represent a cross section of possible ranges. Two types of alkali silicates were also used, sodium and calcium silicate. The concentration of the alkali silicate was also varied from 5% to 50% wt to show the range of possible concentrations. Each coatings was applied onto copper coupons. Prior to gel application, the copper coupons cut from copper sheets (C110, Fullerton Metals) were rinsed with reagent alcohol.

Each formulation was mixed together and applied onto a copper coupon at a thickness between 5 and 10 mils. The coatings were allowed to set for at least 24 hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

| Formulations used for ESCA/XPS analysis on copper | | | | |
| --- | --- | --- | --- | --- |
| Sample # | 1 | 2 | 3 | 4 |
| Durasyn 174 wt. % | 89 | 74 | 89 | 44 |
| Fumed Silica wt. % | 6 | 6 | 6 | 6 |
| Sodium | 0 | 0 | 5 | 50 |

-continued

Formulations used for ESCA/XPS analysis on copper

| Sample # | 1 | 2 | 3 | 4 |
|---|---|---|---|---|
| silicate wt. % | | | | |
| Calcium silicate wt. % | 5 | 20 | 0 | 0 |

ESCA was used to analyze the surface of each of the substrates. ESCA detects the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2p) binding energy (BE) in the low 102 eV range, typically between 102.1 to 102.3. The silica can be seen by Si(2p) BE between 103.3 to 103.6 eV. The resulting spectra show some overlapping peaks, upon de-convalution reveal binding energies in the ranges representative of metal silicate and silica.

EXAMPLE 18

A solvent free formulation having the following components was prepared:

| COMPONENT | SUPPLIER | AMOUNT |
|---|---|---|
| Polybutene | H-50/AMOCO | 58–63 wt. % |
| urethane | F-34 m-100 Reichhold Chem. | 14–16% |
| silica | Cab-o-sil TS 720 Cabot Corp. | 4–6% |
| Ca-silicate | Hubersorb 600 Huber Corp. | 6–10% |
| Li-Stearate | Reagens of Canada | 4–8% |
| linseed oil | OKO-S70 ADM | 4–6% |

The formulation was prepared by adding the polybutene base oil into a into 600 mL stainless steel beaker mixing container. The OKO S70 linseed oil was added and stirred into the polybutene to form a first mixture. The mixture was heated to a temperature of 150 F. by placing the mixing container on a hot plate. Using a mixing apparatus similiar to one described above in Example 10, the powdered components of the formulation were admixed into the heated base oil (or first mixture). The powdered components were added gradually until the admixture is relatively thick.

A second mixture was prepared by heating the Urethane to a temperature of 150 F. thereby forming a liquid. The second mixture was introduced into the first mixture and blended in the 600 mL stainless steel beaker until smooth. A vacuum was applied to the formulation to remove any entrained air. The formulation was allowed to cool to room temperature before testing or application.

The thermal stability of the formulation was tested in accordance with Example 11 above. The formulation sustained heat at 220 F. for 7 days with no visible adverse affects. The hydrothermal stability of the formulation was tested in accordance with Example 11 above for a period 24 hrs. at 240–250 F. at a pressure of 1 atmosphere (gage). No adverse affects were visually detected. The corrosion resistance of the formulation was tested in accordance with the B117 salt corrosion procedures set forth above in Example 11. After 10 days exposure, a 0.010 in. thickness coating of the formulation upon a steel test panel possessed less than 5% surface area red rust.

The formulation was applied upon a steel panel and covered with wollastonite insulation in order to determine oil loss into the insulation. The insulation was removed and inspected for oil migrating from the formulation into the insulation. After a period of 7 days, less than 15 wt. % of the oil had been absorbed by the insulation.

EXAMPLE 19

A solvent free formulation having the following components was prepared:

| COMPONENT | SUPPLIER | AMOUNT |
|---|---|---|
| Polybutene | H-50/AMOCO | 58–63 wt. % |
| epoxy | Epon SU 2.5/Shell Oil | 14–16% |
| silica | Cab-o-sil TS 720 Cabot Corp. | 4–6% |
| Ca-silicate | Hubersorb 600 Huber Corp. | 6–10% |
| Li-Stearate | Reagens of Canada | 4–8% |
| linseed oil | OKO-S70 ADM | 4–6% |

The formulation was prepared by adding the polybutene base oil into a into 600 mL stainless steel beaker mixing container. The OKO S70 linseed oil was added and stirred into the polybutene to form a first mixture. The mixture was heated to a temperature of 150 F. by placing the mixing container on a hot plate. Using a mixing apparatus similiar to one described above in Example 10, the powdered components of the formulation were admixed into the heated base oil (or first mixture). The powdered components were added gradually until the admixture is relatively thick.

A second mixture was prepared by heating the SU 2.5 epoxy to a temperature of 150 F. thereby forming a liquid. The second mixture was introduced into the first mixture and blended in a 600 mL stainless steel beaker until smooth. A vacuum was applied to the formulation to remove any entrained air. The formulation was allowed to cool to room temperature before testing or application.

The thermal stability of the formulation was tested in accordance with Example 11 above. The formulation sustained heat at 250 F. for 3 days and at 300 F. for 10 days with no visible adverse affects. The hydrothermal stability of the formulation was tested in accordance with Example 11 above for a period 24 hrs. at 240–250 F. at a pressure of 1 atmosphere. No adverse affects were visually detected. The corrosion resistance of the formulation was tested in accordance with the B117 salt corrosion procedures set forth above in Example 11. After 10 days exposure, a 0.010 in. thickness coating of the formulation upon a steel test panel possessed less than 5% surface area red rust.

EXAMPLE 20

A precoating or primer formulation having the following formulation was prepared:

| COMPONENT | SUPPLIER | AMOUNT |
|---|---|---|
| polybutene | L-50 or L-14/AMOCO | 96–98% |
| silica | Cab-o-sil TS 720/Cabot Corp | 1–2% |
| ca-silicate | Hubersorb 600/Huber Corp | 1–2% |

The components of this formulation were admixed in accordance with the method described in Example 7. This formulation can be applied upon a 2 inch iron pipe as a primer or pre-coating before application of a CUI inhibitor such as the formulation described in Examples 18 and 19. The primer functions to penetrate surface non-uniformities and scale.

EXAMPLE 21

This Example demonstrates lanolin containing gel formulations. These formulas can be used to reduce corrosion on wire ropes. These formulations can be introduced into the wire rope during manufacture or thereafter by hand or pressure application methods.

|  |  | COMPONENT | | | | | | | |
|---|---|---|---|---|---|---|---|---|---|
| SUPPLIER | COMPONENT | Wt. % | Wt. % | Wt. % | Wt. % | Wt. % | Wt. % | Wt. % | Wt. % |
| Lanaetex Products Inc. | Lanolin USP | 32.50 | 5.00 | 13.75 | 13.75 | 13.75 | 10.00 | 14.50 | 10.50 |
| Cabot Corporaton | Cabosil TS-720, Fumed Silica | 6.50 | 6.50 | 6.50 | 6.50 | 6.50 | 6.50 | 6.80 | 6.80 |
| Reagens Comiel Canada | Lithium Stearate | | | | 5.00 | | 10.00 | | 10.50 |
| Witco Corporation | SACI 760, Calcium Sulfonate | | | | | | 5.00 | 5.00 | |
| Shamrock Technologies | S-395-N5 Polyethylene | | 27.50 | 5.00 | | | | | |
| Shell Chemical Company | EPON Resin SU-2.5, Epoxy Resin | | | 13.75 | 13.75 | 13.75 | 7.50 | 14.50 | 8.00 |
| Amoco Chemical Company | Durasyn 174 PAO, Polyalfaolefin Oil | 61.00 | 61.00 | 61.00 | 61.00 | 61.00 | 61.00 | 64.20 | 64.20 |

These formulations were prepared by heating the polyalphaolefin oil to a temperature of 150 F. in a 600 mL stainless steel beaker mixing container. While maintaining the temperature at 150 F., the lanolin component was mixed into the oil with a glass stirring rod thereby forming a mixture. The remaining components were blended together and introduced into the mixture.

Each of these formulations was tested for corrosion resistance in accordance with Federal Test Standard 791c, Method 4001.3 (20% salt spray). The formulation was applied with an adjustable gate applicator onto standard cold roll steel test panels (ACT Laboratories) at approximately 0.008 inches thick and placed into a testing chamber. Each of the formulations survived 14 days salt spray without any visible signs of rust.

EXAMPLE 22

This Example demonstrates using sodium silicate powders having a relatively small particle size in a wide range of formulations. These Examples were prepared in accordance with the method described in Example 21. These formulations were tested in accordance with the methods described above in Example 21 and survived 14 days in salt spray without any visible signs of rust.

EXAMPLE 23

A formulation having the following formulation was prepared in accordance with Example 11.

| COMPONENT | SUPPLIER | AMOUNT |
|---|---|---|
| Polybutene | H-50 AMOCO | 58–63 wt. % |
| Epoxy Resin | EP0tuf 692 - Reichhold Chemical | 15–20 wt. % |
| Linseed Oil | OKO S70-ADM | 2–5 wt. % |
| Fumed Silica (Cab-o-sil) | TS720 - Cabot Corp. | 4–6 wt. % |
| Sodium Silicate | >200 mesh PQ Corp | 8–10 wt. % |
| Lithium Stearate | Reagens - Reagen Co. Canada | 4–7 wt. % |

EXAMPLE 24

The corrosion resistance or ability of the inventive grease/gel described in Examples 13 and 23 to inhibit rust formation was determined in accordance with "Measurement of Corrosion Under Insulation and Effectiveness of Protective Coatings" by Dharma Abayaratha et al., March 1997, NACE International; the disclosure of which is hereby incorporated by reference. This testing method determines the rate of corrosion as a function of electrical resistance.

The results of this determination are better understood by reference to FIG. 1. Referring now to FIG. 1, FIG. 1 is a graphical representation of the corrosion rate of unprotected

|  |  | COMPONENT | | | | | | | |
|---|---|---|---|---|---|---|---|---|---|
| SUPPLIER | COMPONENT | Wt. % | Wt. % | Wt. % | Wt. % | Wt. % | Wt. % | Wt% | Wt. % |
| Lanaetex Products Inc. | Lanolin USP | | 5.00 | | 13.75 | 10.00 | 10.00 | 10.00 | 14.70 |
| Cabot Corporaton | Cabosil TS-720, Fumed Silica | 6.50 | 6.50 | 6.50 | 6.50 | 6.50 | 6.50 | 6.50 | 6.60 |
| Reagens Comiel Canada | Lithium Stearate | | | | | 10.00 | 10.00 | 7.50 | 4.90 |
| Witco Corporation | SACI 760, Calcium Sulfonate | | | | | | 2.50 | 2.50 | 7.40 |
| Shamrock Technologies | S-395-N5 Polyethylene | | 27.50 | 27.50 | | | | 5.00 | 2.50 |
| PQ Corporation | Sodium Silicate (less than 200 mesh) | 32.50 | | 5.00 | 5.00 | 5.00 | 2.50 | 2.50 | 2.50 |
| Shell Chemical Company | EPON Resin SU-2.5, Epoxy Resin | | | | 13.75 | 7.50 | 7.50 | 5.00 | 7.40 |
| Amoco Chemical Company | Durasyn 174 PAO, Polyalfaolefin Oil | 61.00 | 61.00 | 61.00 | 61.00 | 61.00 | 61.00 | 61.00 | 54.00 | steel pipe (Plot A), a steel pipe coated with the formulation of Example 23 (Plot B) and a steel pipe coated with the formulation of Example 13 (Plot C). A layer of pearlite insulation was placed over all of the test pipes. Each of the pipes was exposed to an environment that cycled between salt water at 150 F. to drying at 230 F. As illustrated by FIG. 1, Plot A, an unprotected pipe corrodes rapidly under insulation whereas the inventive grease/gel reduces, if not eliminates, corrosion under insulation.

The following is claimed:

1. A lubricant, grease or gel composition comprising a combination of:

at least one base oil about 45 to about 90 wt %, at least one polymer, about 1 to about 50 wt. % of at least one thickener comprising at least one member from the group consisting of calcium silicate, lithium silicate, potassium silicate and sodium silicate; and, at least one dispersion oil.

2. A lubricant, grease or gel composition comprising a combination of:

at least one base oil about 45 to about 90 wt. %, at least one cross-linkable polymer that is at least partially miscible in said at least one base oil about 1 to about 50 wt. % of at least one thickener comprising at least one member from the group consisting of calcium silicate, lithium silicate, potassium silicate and sodium silicate; and, at least one dispersion oil, wherein the amount of base oil is sufficient to inhibit polymer cross-linking.

3. A lubricant, gel or grease composition comprising a combination of at least one base oil about 45 to about 90 wt. % wherein said base oil is selected from the group consisting of polyalkenes, at least one polymer selected from the group consisting of urethane, epoxies, oil modified epoxies and an epoxy ester; and about 1 to about 50 wt. % of a thickener comprising at least one member from the group consisting of calcium silicate, lithium silicate, potassium silicate and sodium silicate.

4. A lubricant, gel or grease composition comprising a combination of at least one base oil about 45 to about 90 wt. % wherein said base oil is selected from the group consisting of polymerized 1-decene and polybutene, at least one polymer selected from the group consisting of cross-linkable polymers; and about 1 to about 50 wt. % of a thickener comprising at least one member from the group consisting of calcium silicate, lithium silicate, potassium silicate and sodium silicate.

5. The lubricant, grease or gel composition of any one of claims 1, 2, or 3 wherein the base oil comprises at least one member selected from the group consisting of polybutene, polyalphaolefin, and mixtures thereof.

6. The lubricant, grease or gel composition of claim 1 or 2 wherein the dispersion oil comprises at least one member selected from the group consisting of linseed, castor, canola, mineral, olive, peanut, sunflower, corn, soybean, cedar, pine, conconut, tung, rapeseed, jojoba, meadow foam, cottonseed, sesame and palm.

7. The lubricant, gel or grease composition of any one of claims 1, 2, 3 or 4 wherein said thickener comprises sodium silicate.

8. The lubricant, grease or gel composition of any one of claims 1, 2, 3 or 4 further comprising lithium stearate.

9. The lubricant, grease or gel composition of any one of claims 1, 2, 3 or 4 further comprising at least one member selected from calcium sulfonate, polyethylene and mixtures thereof.

10. A method for reducing corrosion comprising:

applying the composition of any one of claims 1, 2, 3 or 4 upon a substrate comprising at least one member selected from the group consisting of wire rope, anchor connecting links, pipes, strand, jacketed cables or tendons, battery terminals and mechanical latch mechanisms.

11. The method of claim 10 wherein at least a portion of the substrate is covered by insulation.

12. The, lubricant, gel or grease composition of any one of claims 1, 2, 3 or 4 further comprising at least one additive selected from the group consisting of polyethylene, polyvinylidene difluoride, polythetrafluoroethylene, polyvinyl fluoride, polyisobutylene, phosphate esters, dithiophosphates, dithiocarbonates, calcium carbonate, zinc stearate, ammonium molybdate, chlorinated paraffins, graphite, molybolenum disulfide, tungsten disulfide, zinc oxide, zinc borate, borax, boron nitride, tricresyl phosphate, triphenyl phosphorothionate, fatty acid esters; sulfurized or phospite adducted fatty oils, fatty acids, or fatty acid esters.

13. The lubricant, gel or grease composition of any one of claims 1, 2, 3 or 4 wherein the polymer comprises urethane.

14. The lubricant, gel or grease composition of any one of claims 1, 2, 3 or 4 wherein the polymer comprises an epoxy or epoxy ester.

15. The lubricant, gel or grease composition of any one of claims 1, 2, 3 or 4 wherein the grease comprises lanolin or lanolin oil.

16. The lubricant, gel or grease composition of any one of claims 1, 2, 3 or 4 further comprising at least one member selected from the group consisting of aromatic amines, hindered phenols, diphenylamine, phenyl alpha-naphthylamine, 2,6-di-t-butylphenol, phenothiazine, alkylated diphenylamines, alkylated phenyl alpha-naphthylamines, 2,6-di-t-butyl-p-cresol (BHT), polymeric BHT, peroxide decomposers, or a substituted hydroxyphenyl benzotriazole.

17. A method for improving the corrosion resistance of metal surface comprising applying the composition of any one of claims 1, 2, 3 or 4 wherein said applying comprises at least one of spraying, pumping, hand applying, brushing, trowelling, gloved, immersing, or pressure injected.

18. The lubricant, gel or grease composition of claim 6 wherein the dispersion oil comprises linseed.

19. The lubricant, gel or grease composition of claim 12 wherein the additive comprises polyethylene.

20. The lubricant, gel or grease composition of any one of claims 1, 2, 3 or 4 wherein the composition is solvent free.

21. The lubricant, grease or gel composition of any one of claims 1, 2, 3 or 4 wherein the thickener further comprises silica.

22. The lubricant, grease or gel composition of any one of claims 1, 2, or 4 wherein the polymer comprises at least one member selected from the group consisting of urethane, an epoxy, oil modified epoxies and epoxy ester.

23. The lubricant, gel or grease composition of any one of claims 1, 2, 3 or 4 wherein said thickener comprises calcium silicate.

* * * * *